Feb. 5, 1957  G. F. WALTERS ET AL  2,780,394
APPARATUS FOR FEEDING AND DISTRIBUTING GRANULAR MATERIAL
Filed March 5, 1954
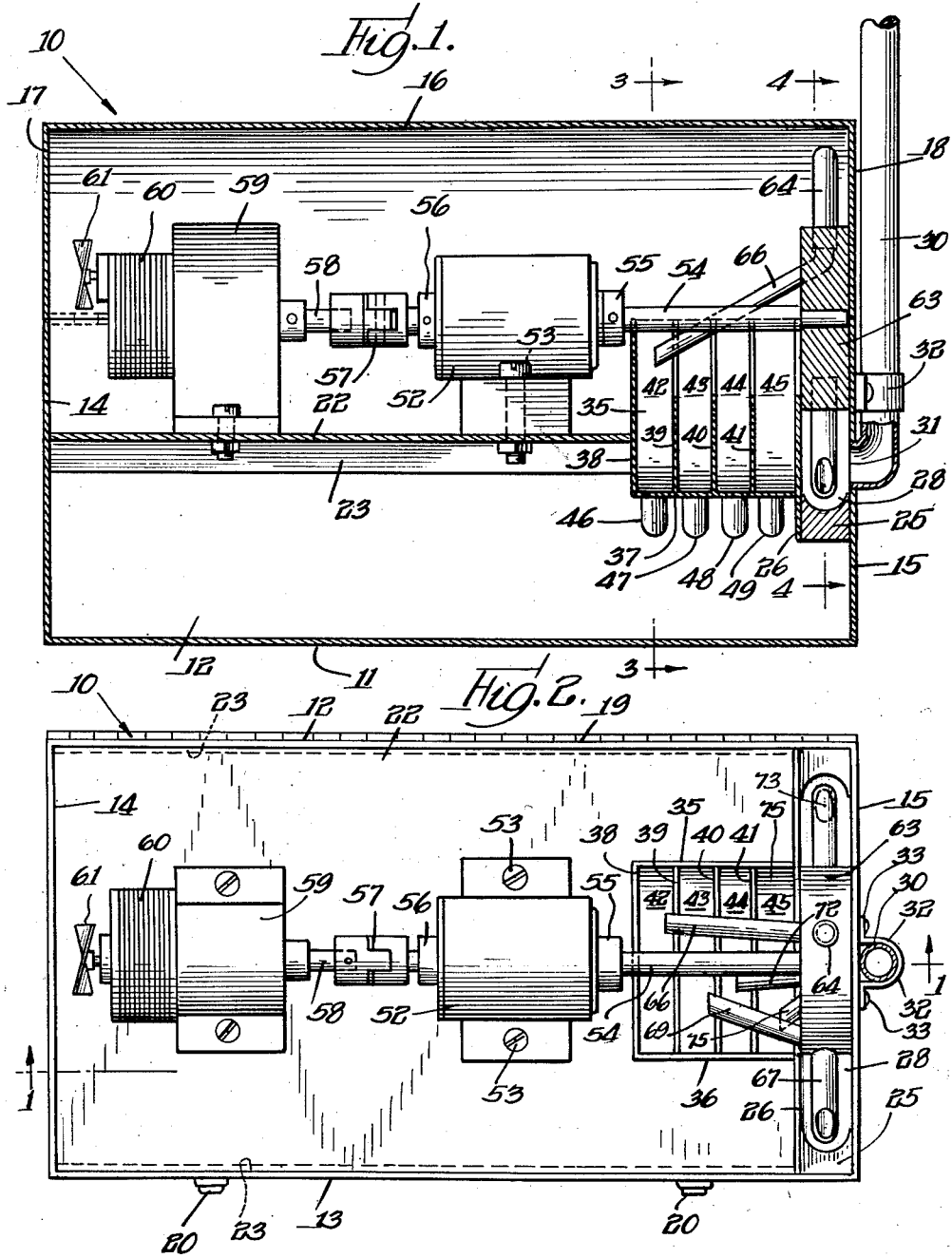
INVENTORS
George F. Walters
Berlin M. Steele
By: Wienstein & Spangenberg
Attys

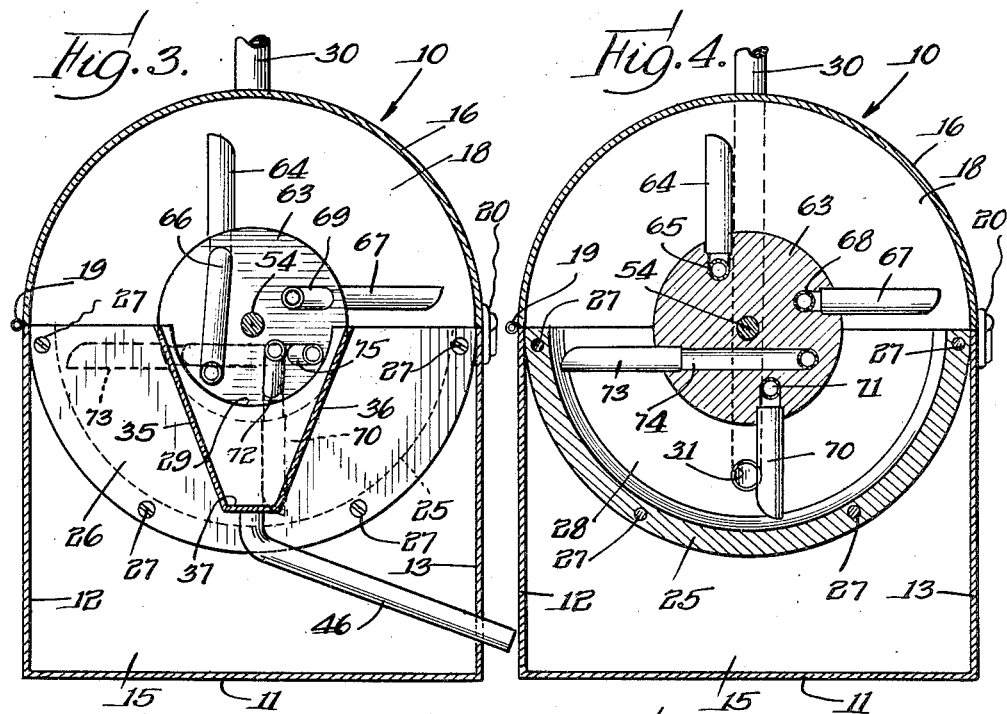
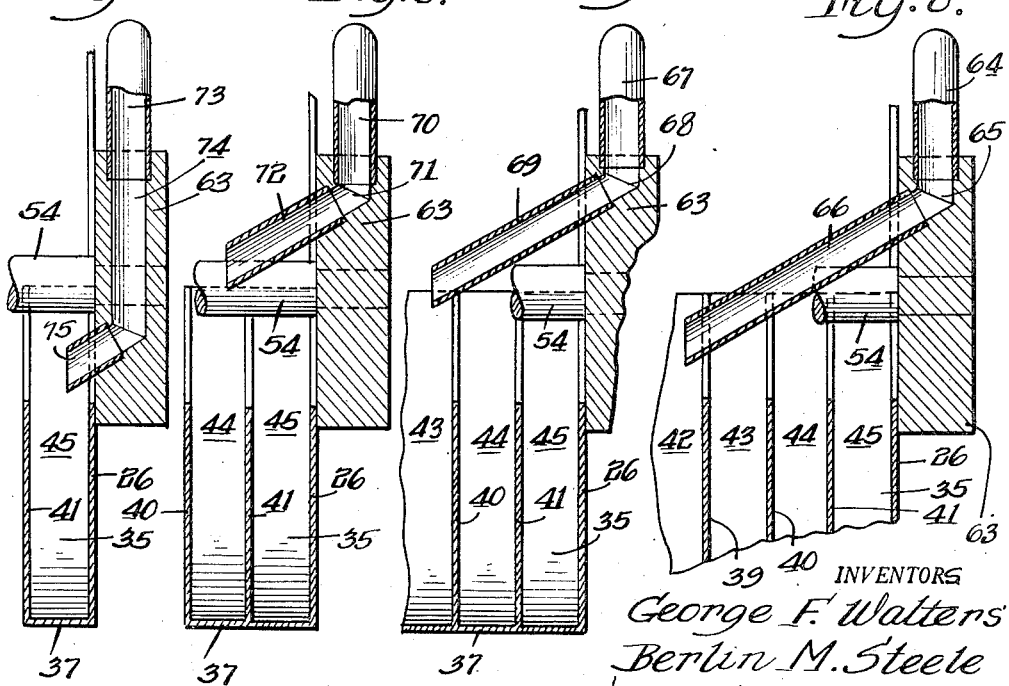

though the opening 31 into the bottom of the supply hopper 28 and operates to maintain a predetermined level of granular material in the supply hopper.
2,780,394

APPARATUS FOR FEEDING AND DISTRIBUTING GRANULAR MATERIAL

George F. Walters, Chicago, Ill., and Berlin M. Steele, North Canton, Ohio, assignors to Oxi Corporation, a corporation of Indiana Application March 5, 1954, Serial No. 414,369

4 Claims. (Cl. 222—273)

This invention is directed to an apparatus for feeding and distributing granular material.

The principal object of this invention is to provide an improved apparatus for feeding and distributing granular material, which accurately feeds measured quantities of the granular material, which distributes the measured quantities of granular material to desired points, which is readily adjustable for feeding and distributing the granular material at desired rates, which is simple in construction and foolproof in operation, and which may be inexpensively manufactured and serviced.

Further objects of this invention reside in the details of construction of the feeding and distributing apparatus and in the cooperative relationships between the component parts thereof.

Other objects and advantages of this invention will become apparent to those skilled in the art upon reference to the accompanying specification, claims and drawings, in which:

Fig. 1 is a vertical sectional view through the feeding and distributing apparatus of this invention and taken substantially along the line 1—1 of Fig. 2;

Fig. 2 is a top plan view of the apparatus with the cover removed;

Fig. 3 is a vertical sectional view taken substantially along the line 3—3 of Fig. 1;

Fig. 4 is a vertical sectional view taken substantially along the line 4—4 of Fig. 1;

Figs. 5, 6, 7 and 8 are enlarged partial sectional views of a portion of the apparatus showing the parts in different positions.

The apparatus of this invention for feeding and distributing granular material is generally designated at 10. It includes a box like base or housing having a bottom wall 11, side walls 12 and 13 and end walls 14 and 15. It also includes a cover having a semi-cylindrical wall 16 and end walls 17 and 18. The cover is pivoted to the base by suitable hinges 19 and is latched to the base by a suitable latch mechanism 20.

A supporting member 22 is secured in the base by means of flanges 23 suitably secured to the side walls 12 and 13 of the base. A semi-circular member 25 and a semi-circular plate 26 are secured to the end wall 15 of the base by means of screws 27. The end wall 15, the semi-circular member 25 and the semi-circular plate 26 form a supply hopper 28 which is open at its top and which has substantially parallel sides and a substantially semi-circular bottom. The top of the plate 26 is provided with a semi-circular opening 29.

A vertical conduit 30 which may take the form of a pipe or tube, has its lower end opening into the supply hopper as indicated at 31. The conduit 30 may be secured to the end wall 15 of the base by means of a bracket 32 and screws 33. Granular material is fed by gravity through the conduit 30 and the opening 31 into the bottom of the supply hopper 28 and operates to maintain a predetermined level of granular material in the supply hopper.

A multichamber discharge hopper is located within the housing adjacent to the supply hopper 28. This multichamber discharge hopper includes side walls 35 and 36 and a bottom wall 37. An end wall 38 closes one end of the hopper and the other end of the hopper is closed by the plate 26. Located within the hopper are three plates 39, 40 and 41 which divide the hopper into four discharge hoppers 42, 43, 44 and 45. Conduits in the form of tubes 46, 47, 48 and 49 extend from the bottoms of the discharge hoppers 42, 43, 44 and 45, respectively. These conduits may extend outwardly through the side wall 13 of the base for conveying granular material from the respective discharge hoppers.

A bearing 52 is secured to the support 22 by means of screws 53 and this bearing 52 rotatably journals a shaft 54 which extends over the discharge hoppers 42, 43, 44 and 45 and the supply hopper 28. The shaft 54 is held in proper longitudinal position in the bearing 52 by means of collars 55 and 56 secured to the shaft 58 which in turn is driven by a gear reducer 59. The gear reducer is driven by an electric motor 60 which may be provided with a fan 61 for cooling the same. As the electric motor is operated, the gear reducer 59 operates to drive the shafts 58 and 54 at a relatively slow speed.

The end of the shaft 54 has a member 63 secured thereto, the member 63 rotating at a relatively slow speed with the shaft 54. A scoop tube 64 is secured in the member 63 and it is connected by a passage 65 with a discharge tube 66 which extends over the discharge hopper 42. In a like manner, a scoop tube 67 is secured to the rotating member 63 and is connected by a passage 68 to a discharge tube 69 which extends over the discharge hopper 45. Another scoop tube 70 is secured to the rotating member 63 and it is connected by a passage 71 to a discharge tube 72 extending over the discharge hopper 43. Another scoop tube 70 is ried by the rotating member 63 is connected by a passage 74 to a discharge tube 75 extending over the discharge hopper 45. As the rotating member 63 is rotated by the shaft 54, the scoop tubes 64, 67, 70 and 73 consecutively move through the supply hopper 28 and operate to scoop granular material from the hopper. The granular material which is scooped up by the scoop tubes 64, 67, 70 and 73 are then discharged through the discharge tubes 66, 69, 72 and 75 into the discharge hoppers 42, 43, 44 and 45, respectively. In this respect, the scoop tubes 64, 67, 70 and 73 are provided with inlet or scooping openings of desired size for scooping the desired amount of granular material from the supply hopper 28. By regulating the size of these openings, the amount of granular material scooped up by each scoop tube may be predetermined.

In a particular embodiment of this invention wherein the radius of the bottom of the supply hopper 28 is substantially three inches, wherein the supply opening 31 is substantially three-eights inch in diameter and located two and three-quarter inches from the center of radius of the bottom wall of the supply hopper, wherein the scoop tubes 64, 67, 70 and 73 are one-half inch tubes and have oval shaped openings three-eights inch by seven-sixteenths inch, and wherein the scoop tubes are rotated at a speed of twelve R. P. M., the scoop tubes each distribute and feed to their respective discharge housings, granular material at the rate of one pound per hour. By regulating the speed of the electric motor and hence the speed of rotation of the shaft 54 the rate of feeding and distributing the granular material may be varied. Also, by changing the sizes of the openings in the scoop tubes the rate of feed of granular material by each scoop tube may also be varied.

While the feeding and distributing apparatus of this invention has general utility, it is particularly useful for feeding and distributing desired amounts of suitable salts to a combustion apparatus for enhancing combustion conditions.

While for purposes of illustration, one form of this invention has been disclosed other forms thereof may become apparent to those skilled in the art upon reference to this disclosure and therefore this invention is to be limited only by the scope of the appended claims.

We claim as our invention:

1. In an apparatus for feeding granular material, a supply hopper open at its top and having a substantially semi-circular bottom, a conduit extending through one of the sides of the supply hopper for feeding granular material into the hopper, a discharge hopper adjacent the other side of the supply hopper, a rotary member, means for rotatably mounting the rotary member in the open top of the supply hopper for rotation substantially concentrically with the semi-circular bottom of the supply hopper, a scoop tube carried by the rotary member and extending outwardly from the rotating periphery thereof and moved through the supply hopper adjacent the substantially circular bottom thereof for scooping granular material from the hopper, a discharge tube carried by the rotary member and extending from one side thereof over the discharge hopper, and a passage in the rotary member connecting the scoop tube and the discharge tube for discharging granular material scooped up by the scoop tube through the passage and discharge tube into the discharge hopper as the rotary member is rotated.

2. In an apparatus for feeding and distributing granular material, a supply hopper open at its top and having substantially parallel sides and a substantially semi-circular bottom, a conduit extending through one of the sides of the supply hopper for feeding granular material into the hopper, a plurality of discharge hoppers arranged in parallel on the other side of the supply hopper, a rotary member, means for rotatably mounting the rotary member in the open top of the supply hopper for rotation substantially concentrically with the semi-circular bottom of the supply hopper, a plurality of scoop tubes carried by the rotary member and extending outwardly from the rotating periphery thereof and moved through the supply hopper adjacent the substantially circular bottom thereof for scooping granular material from the hopper, a plurality of discharge tubes carried by the rotary member and extending from one side thereof respectively over the plurality of discharge hoppers, and a plurality of passages in the rotary member connecting the plurality of scoop tubes respectively with the plurality of discharge tubes for distributing and discharging granular material scooped up by the scoop tubes through the passages and discharge tubes into the respective discharge hoppers as the rotary member is rotated.

3. In an apparatus for feeding granular material, a supply hopper open at its top and having substantially parallel sides and a substantially semi-circular bottom, a conduit extending through one of the sides of the supply hopper for feeding granular material into the hopper, a discharge hopper adjacent the other side of the supply hopper, a rotary member, a shaft extending above the discharge hopper and carrying the rotary member for rotatably mounting the rotary member in the open top of the supply hopper for rotation substantially concentrically with the semi-circular bottom of the supply hopper, a bearing rotatably supporting the shaft, an electric motor, a speed reducer connected to and driven by the electric motor, means connecting the speed reducer to the shaft for rotating the shaft, a scoop tube carried by the rotary member and extending outwardly from the rotating periphery thereof and moved through the supply hopper adjacent the substantially circular bottom thereof for scooping granular material from the hopper, a discharge tube carried by the rotary member and extending from one side thereof over the discharge hopper, and a passage in the rotary member connecting the scoop tube and the discharge tube for discharging granular material scooped up by the scoop tube through the passage and discharge tube into the discharge hopper as the rotary member is rotated.

4. In a machine for feeding and distributing granular material, a supply hopper open at its top and having substantially parallel sides and a substantially semi-circular bottom, a conduit extending through one of the sides of the supply hopper for feeding granular material into the hopper, a plurality of discharge hoppers arranged in parallel on the other side of the supply hopper, a rotary member, a shaft extending above the plurality of discharge hoppers and carrying the rotary member for rotatably mounting the rotary member in the open top of the supply hopper for rotation substantially concentrically with the semi-circular bottom of the supply hopper, a bearing rotatably supporting the shaft, an electric motor, a speed reducer connected to and driven by the electric motor, means connecting the speed reducer to the shaft for rotating the shaft, a plurality of scoop tubes carried by the rotary member and extending outwardly from the rotating periphery thereof and moved through the supply hopper adjacent the substantially circular bottom thereof for scooping granular material from the hopper, a plurality of discharge tubes carried by the rotary member and extending from one side thereof respectively over the plurality of discharge hoppers, and a plurality of passages in the rotary member connecting the plurality of scoop tubes respectively with the plurality of discharge tubes for distributing and discharging granular material scooped up by the scoop tubes through the passages and discharge tubes into the respective discharge hoppers as the rotary member is rotated.

References Cited in the file of this patent

UNITED STATES PATENTS

| | | |
|---|---|---|
| 960,782 | Baylis | June 7, 1910 |
| 2,327,124 | Morse | Aug. 17, 1943 |
| 2,476,163 | Trebler | July 12, 1949 |